United States Patent
Hussmann

(10) Patent No.: US 11,067,038 B2
(45) Date of Patent: Jul. 20, 2021

(54) DEVICE FOR ADDING A FLUID TO COMBUSTION AIR OF AN INTERNAL COMBUSTION ENGINE

(71) Applicant: Bayerische Motoren Werke Aktiengesellschaft, Munich (DE)

(72) Inventor: Bjoern Hussmann, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/413,704

(22) Filed: May 16, 2019

(65) Prior Publication Data
US 2019/0271283 A1     Sep. 5, 2019

Related U.S. Application Data

(63) Continuation of application No. PCT/EP2018/051624, filed on Jan. 24, 2018.

(30) Foreign Application Priority Data

Mar. 9, 2017   (DE) ................. 10 2017 203 927.2

(51) Int. Cl.
    *F02B 47/02*        (2006.01)
    *F02M 25/022*     (2006.01)
    (Continued)

(52) U.S. Cl.
    CPC ........... *F02M 25/0222* (2013.01); *F01P 3/20* (2013.01); *F02B 47/02* (2013.01); *F02M 25/025* (2013.01);
    (Continued)

(58) Field of Classification Search
    CPC ......... F01N 2610/02; F01N 2610/1406; F01N 2610/1473; F01N 2610/10
    (Continued)

(56) References Cited

U.S. PATENT DOCUMENTS 2,605,752 A    8/1952   Hall
3,983,882 A    10/1976   Billings
(Continued)

FOREIGN PATENT DOCUMENTS

CN           1851252 A     10/2006
CN        201152207 Y     11/2008
(Continued)

OTHER PUBLICATIONS

International Search Report (PCT/ISA/210) issued in PCT Application No. PCT/EP2018/051624 dated Mar. 12, 2018 with English translation (seven pages).

(Continued)

*Primary Examiner* — Long T Tran
*Assistant Examiner* — James J Kim
(74) *Attorney, Agent, or Firm* — Crowell & Moring LLP

(57) ABSTRACT

A device for adding a fluid to combustion air of an internal combustion engine for a motor vehicle includes a first fluid container from which the fluid can be removed and supplied to the combustion air. A second fluid container is provided, which is connected to the first fluid container via a line so as to carry fluid. A fluid pump is arranged in the line. As a result of the configuration, the fluid in the first fluid container can quickly be warmed and decontaminated.

10 Claims, 1 Drawing Sheet

(51) Int. Cl.
*F01P 3/20* (2006.01)
*F02M 25/025* (2006.01)

(52) U.S. Cl.
CPC .... *F02M 25/0221* (2013.01); *F02M 25/0224* (2013.01); *F01P 2060/18* (2013.01); *Y02T 10/12* (2013.01)

(58) Field of Classification Search
USPC ........................................... 123/25 B
See application file for complete search history.

(56) References Cited

U.S. PATENT DOCUMENTS

| | | | | |
|---|---|---|---|---|
| 4,336,773 | A * | 6/1982 | Carouthers | F02M 25/035 123/25 B |
| 5,121,713 | A * | 6/1992 | Peterson | F02B 47/02 123/25 A |
| 5,884,475 | A * | 3/1999 | Hofmann | B01D 53/9431 60/274 |
| 7,013,845 | B1 * | 3/2006 | McFarland | F02B 51/02 123/3 |
| 10,240,504 | B2 | 3/2019 | Nakao et al. | |
| 2009/0311147 | A1 | 12/2009 | Georis et al. | |
| 2010/0326546 | A1 | 12/2010 | Haeberer et al. | |
| 2015/0001338 | A1 | 1/2015 | Smague et al. | |
| 2015/0013338 | A1 * | 1/2015 | Smague | F01K 13/02 60/645 |
| 2015/0345877 | A1 * | 12/2015 | Mori | F28F 9/22 165/138 |
| 2016/0061155 | A1 * | 3/2016 | Takagi | F02M 25/0818 73/40.5 R |
| 2017/0107950 | A1 * | 4/2017 | Hoegl | F02M 25/03 |
| 2017/0241352 | A1 * | 8/2017 | Kurotani | F02D 19/0655 |
| 2017/0321582 | A1 * | 11/2017 | Nakao | B01D 53/90 |
| 2018/0128212 | A1 * | 5/2018 | Burak | F02M 25/0224 |
| 2019/0257270 | A1 * | 8/2019 | Burak | F02M 25/0222 |

FOREIGN PATENT DOCUMENTS

| | | |
|---|---|---|
| CN | 102635432 A | 8/2012 |
| DE | 195 43 884 A1 | 7/1997 |
| DE | 100 26 695 C1 | 8/2001 |
| DE | 10 2005 053 495 A1 | 12/2006 |
| DE | 10 2006 061 732 A1 | 7/2008 |
| DE | 11 2007 002 720 T5 | 12/2009 |
| DE | 10 2015 220 326 A1 | 4/2017 |
| DE | 10 2017 121 754 A1 | 11/2017 |
| EP | 3 018 331 A1 | 5/2016 |
| EP | 3 023 619 A1 | 5/2016 |
| EP | 2 778 381 B1 | 6/2016 |
| EP | 2 789 839 B1 | 7/2016 |
| JP | WO 2016/063697 A1 | 4/2016 |
| WO | WO 81/02325 A1 | 8/1981 |

OTHER PUBLICATIONS

German-language Written Opinion (PCT/ISA/237) issued in PCT Application No. PCT/EP2018/051624 dated Mar. 12, 2018 (six pages).
German-language Search Report issued in counterpart German Application No. 10 2017 203 927.2 dated Nov. 10, 2017 with partial English translation (13 pages).
Chinese-language Office Action issued in Chinese Application No. 201880004809.8 dated Aug. 11, 2020 with English translation (12 pages).
Chinese-language Office Action issued in Chinese Application No. 201880004809.8 dated Mar. 2, 2021 with English translation (15 pages).

* cited by examiner

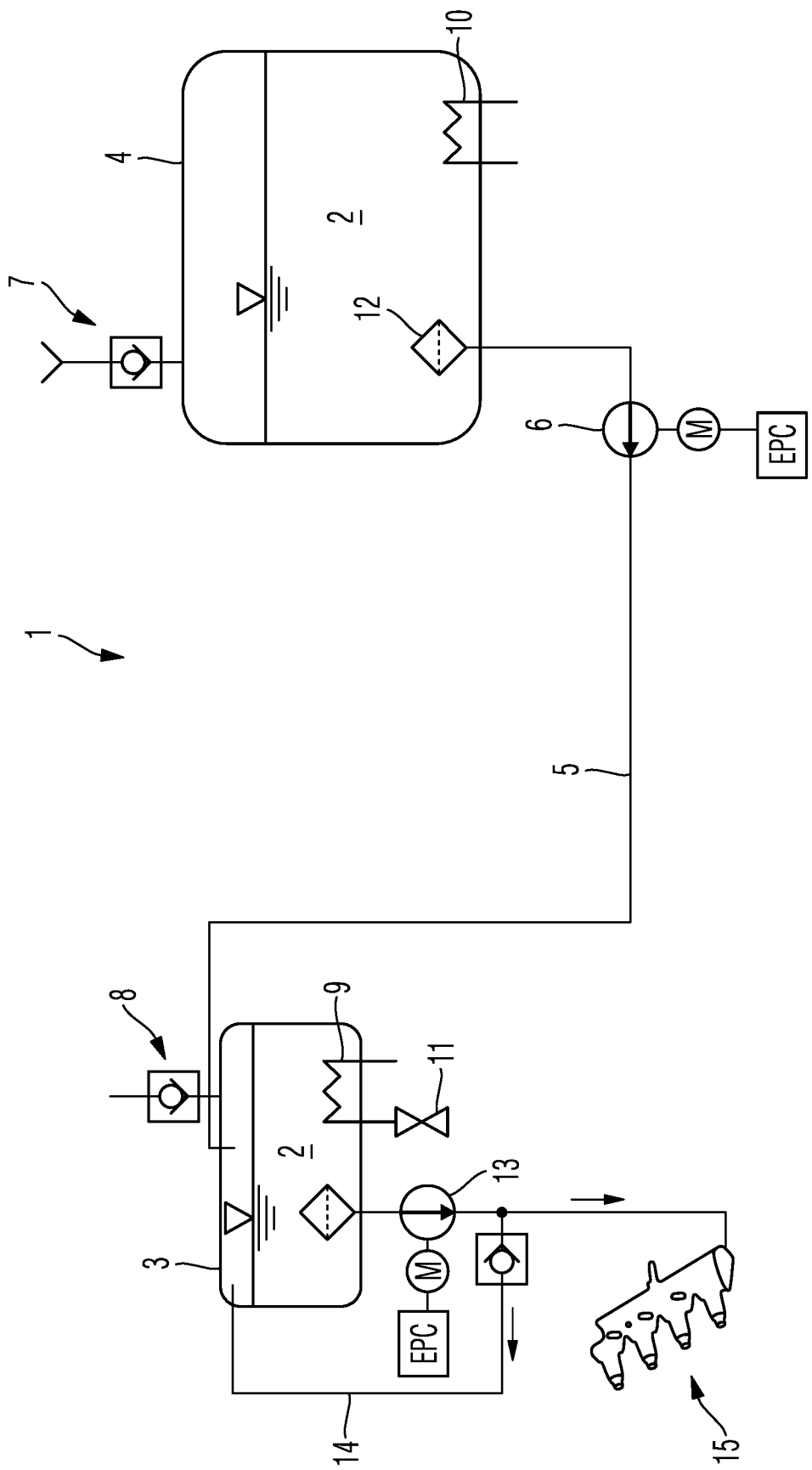

DEVICE FOR ADDING A FLUID TO COMBUSTION AIR OF AN INTERNAL COMBUSTION ENGINE

CROSS REFERENCE TO RELATED APPLICATIONS

This application is a continuation of PCT International Application No. PCT/EP2018/051624, filed Jan. 24, 2018, which claims priority under 35 U.S.C. § 119 from German Patent Application No. 10 2017 203 927.2, filed Mar. 9, 2017, the entire disclosures of which are herein expressly incorporated by reference.

BACKGROUND AND SUMMARY OF THE INVENTION

The invention concerns a device for adding a fluid to combustion air of an internal combustion engine for a motor vehicle.

For the technical background, reference is made, for example, to German publication DE 100 26 695 C1. This publication describes a method and a device for recovering water from an exhaust gas system. A method and a device are described for producing a necessary quantity of water by condensation of the water vapor contained in the exhaust gas, in particular for a water injection system of the internal combustion engine. Here, the condensed water is conducted via a line arrangement and stored in a container. According to DE 100 26 695 C1, the necessary quantity of water is condensed out of the exhaust gas by a condensation device which has a mean condensation efficiency of at least 25%, preferably at least 50%, over the entire operating range of the internal combustion engine. Thus, it is not necessary to provide additional water in a separate refillable tank, but nonetheless permanent water recovery from the exhaust gas is possible.

Furthermore, European publication EP 2 789 839 B1 describes a method of water injection for an internal combustion engine, in which water is injected into the combustion chambers of the internal combustion engine via first injectors only in specific load ranges of the internal combustion engine. Depending on the load range, fuel is injected either directly into the combustion chambers of the internal combustion engine via the first injectors, or into an intake pipe upstream of the combustion chambers via second injectors. In a third load range which lies in a middle rotation speed range substantially at full load, water is injected into the combustion chambers via the first injectors and fuel is injected into the intake pipe exclusively via the second injectors.

For the technical background, reference is also made to European publication EP 2 778 381 B1. This publication describes a method for operating an injection system for injecting water into an injection region of an internal combustion engine by means of an injector with a working chamber which is water-filled in normal operation of the internal combustion engine. The method is characterized in that when the internal combustion engine is switched off, at least some of the water present in the working chamber of the injector is displaced by a gas mixture flowing into the working chamber from the combustion chamber of the internal combustion engine, and the working chamber is at least partially filled with the gas mixture.

Furthermore, European patent application EP 3 023 619 A1, on which the present invention is based, describes a method for controlling combustion in an internal combustion engine with at least one cylinder, wherein the method comprises the following steps:
(i) detection of a knocking intensity in the cylinder by use of a knock sensor,
(ii) setting of a predefined nominal advance angle of the cylinder corresponding to a nominal exhaust gas temperature, and
(iii) controlling an addition of a fluid to the cylinder depending on the detected knocking intensity.

For space reasons, it is not possible to accommodate a fluid tank in the warm interior of the vehicle due to lack of space and for acoustic comfort reasons. At present, an adequate size of the fluid container or water tank can only be created at the vehicle rear, since usually no more space is available in the engine bay. In addition, because there is no heating system in the vehicle rear, ice can disadvantageously form in the tank and not thaw out, and in addition bio-contamination (e.g. multiplication of bacteria) cannot be eliminated.

It is the object of the present invention to avoid the above-mentioned disadvantages.

This object is achieved by a device for adding a fluid to combustion air of an internal combustion engine for a motor vehicle, with a first fluid container from which the fluid can be extracted and supplied to the combustion air, A second fluid container is provided, which is connected fluid-conductively to the first fluid container via a line, wherein a first fluid pump is arranged in the line.

The invention therefore proposes a physical separation and division of the maximally required tank volume into two tanks which are connected together via a line and a pump.

According to an aspect of the invention, it is proposed that the first fluid container can be heated by a coolant of the internal combustion engine via a first heat exchanger and/or electrically.

In a refinement of the invention, the second fluid container can also be heated electrically via a second heat exchanger. This requires relatively little power since the fluid volume is divided over two containers.

In addition, according to the invention, the first fluid container has a smaller volume than the second fluid container; this measure means that the first fluid container can be heated more quickly than the second fluid container.

Preferably, according to the invention, the first fluid container is arranged in an internal combustion engine compartment (engine bay) of the motor vehicle, which advantageously leads to short coolant lines or, depending on heating method, short electrical lines.

In order to distribute the fluid between the tanks as required, the fluid can be conveyed bidirectionally by way of the fluid pump.

In an advantageous refinement of the invention, the second fluid container comprises a filling device for the fluid, so that fluid or water can be added manually as required.

So that no fluid-displacing air can collect in the first fluid container, the first fluid container preferably comprises a purge device.

Thus, the invention proposes a physical separation of the required tank volume into two fluid containers, one of which (the smaller) is installed in the engine bay and heated via the coolant lines and/or also electrically. The second (larger) fluid container is fitted at the vehicle rear and preferably heated solely electrically. The electric heating capacity available is considerably less than the heating capacity from the coolant because of on-board power network restrictions. The two fluid containers are connected through a transfer pump via a line running through the vehicle.

The invention advantageously allows the smaller fluid volume in the engine bay to be heated quickly and hence the fluid injection system (water injection system) to become available rapidly even in cold and very cold exterior temperatures. Also, decontamination of bacterial contamination, for example, is possible by heating the fluid to above 70° C. The second tank, or the second, larger fluid volume at the vehicle rear, allows the provision of the required total fluid volume. The larger fluid container at the rear can only be heated slowly electrically, but an exchange between the fluid containers may take place via the transfer pump. As soon as the rear fluid container has thawed out, the entire fluid quantity or water quantity is again available for injection.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a diagrammatic depiction of a device according to an embodiment of the invention for the addition of a fluid to a combustion air of an internal combustion engine.

DETAILED DESCRIPTION OF THE DRAWING

FIG. 1 shows diagrammatically a device 1 for adding a fluid 2 to combustion air of an internal combustion engine (not shown) for a motor vehicle (also not shown). The device 1 comprises a first fluid container 3 from which the fluid 2, preferably water, can be extracted and supplied to the combustion air. A filling level of the fluid 2 is marked in the first fluid container 3 with a triangle. The fluid 2 can be conveyed via a second fluid pump 13 to an injection device 15 for addition of the fluid to the combustion air. A flow direction of the fluid is indicated by arrows. The second fluid pump 13 in this exemplary embodiment is powered by an electric motor and controlled by an electronic control unit (EPC).

Surplus fluid may be returned to the first fluid container 3 via a return line 14 in which a check valve (without reference sign) is arranged. Furthermore, the first fluid container 3 may be heated by a coolant of the internal combustion engine via a first heat exchanger 9 and/or electrically (not shown). A coolant quantity for heating the first fluid container 3 is set via a valve 11. A heating power of the coolant, for example from the heating return line, is between around 1 and 6 kW. Furthermore, a purge device 8 is provided for the first fluid container 3 in order to allow the fluid-displacing gas to escape on filling of the first fluid container 3.

According to the invention, a second fluid container 4 is provided which can be connected fluid-conductively to the first fluid container 3 via a line 5, wherein a first fluid pump 6 is arranged in the line 5. By way of this fluid pump 6, the fluid 2 can be conveyed bidirectionally in order to guarantee a fluid exchange between the first fluid container 3 and the second fluid container 4. The first fluid pump 6 is also powered by an electric motor and controlled by the electronic control unit (EPC). A filling level of the fluid in the second fluid container 4 is also indicated by a triangle. Preferably, the second fluid container 4 can be heated purely electrically via a second heat exchanger 10. An electric heating power lies preferably in a range between 80 and 800 W. In addition, the first fluid container 3 has a smaller volume than the second fluid container 4.

In order not to transfer contamination from the second fluid container 4 to the first fluid container 3, preferably a filter 12 is provided inside the second fluid container 4. For manual filling of fluid in the second fluid container 4, a filling device 7 is provided with a check valve (without reference sign).

To ensure short coolant lines, the first fluid container 3 is preferably arranged in an internal combustion engine compartment (engine bay) of the motor vehicle, and thus arranged close to the internal combustion engine, and the second fluid container 4 is arranged at the vehicle rear where there is sufficient installation space.

LIST OF REFERENCE SIGNS

1 Device
2 Fluid
3 First fluid container
4 Second fluid container
5 Line
6 First fluid pump
7 Filling device
8 Purge device
9 First heat exchanger
10 Second heat exchanger
11 Valve
12 Filter
13 Second fluid pump
14 Return line
15 Injection device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for adding a fluid to combustion air of an internal combustion engine for a motor vehicle, comprising:
   a first fluid container from which the fluid is extractable and supplied to the combustion air at an intake of the internal combustion engine;
   a second fluid container, which is connected fluid-conductively to the first fluid container via a line;
   a first fluid pump arranged in the line, wherein
     the first fluid container has a smaller volume than the second fluid container;
     the first fluid container is arranged in an internal combustion engine compartment of the motor vehicle, and
     the first fluid pump conveys the fluid bidirectionally between the first fluid container and the second fluid container.

2. The device according to claim 1, wherein
the internal combustion engine is cooled by the coolant,
the first fluid container is heatable via a first heat exchanger and/or electrically.

3. The device according to claim 2, wherein the second fluid container is heatable electrically via a second heat exchanger.

4. The device according to claim 1, wherein
the second fluid container comprises a filling device for the fluid.

5. The device according to claim 1, wherein
the first fluid container is arranged in an internal combustion engine compartment of the motor vehicle.

6. The device according to claim 1, wherein the second fluid container is located in a rear of the a motor vehicle, and
the first fluid container is arranged in an internal combustion engine compartment of the motor vehicle.

7. The device according to claim 6, wherein the second fluid container is heatable electrically via a heating means disposed in the second fluid container.

8. The device according to claim 1, wherein
the first fluid is water,
the first fluid container is heated by a coolant and includes a purge device, and the second fluid container is heated electrically and includes a filling device.

9. The device according to claim 1, further comprising:
a first heat exchanger that heats the first fluid container; and
a second heat exchanger that heats the second fluid container, wherein
a power range of the first heat exchanger is higher than a power range of the second heat exchanger.

10. The device according to claim 1, wherein the first fluid pump is disposed in the line so to be directly connected to both the first fluid container and the second fluid container.

* * * * *